(12) United States Patent
Kim et al.

(10) Patent No.: US 10,299,620 B2
(45) Date of Patent: May 28, 2019

(54) JUICE EXTRACTOR

(71) Applicant: Jae-Won Kim, Gimhae-si (KR)

(72) Inventors: Jae-Won Kim, Gimhae-si (KR);
Young-Ki Kim, Gimhae-si (KR)

(73) Assignee: Jae-Won Kim, Gimhae-si (KR)

( * ) Notice: Subject to any disclaimer, the term of this patent is extended or adjusted under 35 U.S.C. 154(b) by 672 days.

(21) Appl. No.: 14/896,402

(22) PCT Filed: Aug. 26, 2013

(86) PCT No.: PCT/KR2013/007622
§ 371 (c)(1),
(2) Date: Dec. 7, 2015

(87) PCT Pub. No.: WO2014/196690
PCT Pub. Date: Dec. 11, 2014

(65) Prior Publication Data
US 2016/0120354 A1    May 5, 2016

(30) Foreign Application Priority Data

Jun. 7, 2013    (KR) .......................... 10-2013-0065406

(51) Int. Cl.
*A47J 19/02* (2006.01)
*A47J 19/06* (2006.01)
*A47J 43/07* (2006.01)

(52) U.S. Cl.
CPC .............. *A47J 19/02* (2013.01); *A47J 19/025* (2013.01); *A47J 19/06* (2013.01); *A47J 43/07* (2013.01)

(58) Field of Classification Search
CPC .......... A47J 19/02; A47J 19/025; A47J 19/06; A47J 43/07; A47J 43/042; A47J 19/027; A47J 43/046

(Continued)

(56) References Cited

U.S. PATENT DOCUMENTS

| 8,091,473 B2 * | 1/2012 | Kim ........................ A47J 19/06 100/117 |
| 9,253,995 B2 * | 2/2016 | Shi .......................... A23L 11/07 |
| 2012/0291638 A1 * | 11/2012 | Kim ....................... A47J 19/027 99/501 |

FOREIGN PATENT DOCUMENTS

| KR | 20-1996-0009518 | 10/1996 |
| KR | 10-0755440 | 9/2007 |

(Continued)

OTHER PUBLICATIONS

International Search Report and the Written Opinion dated Mar. 13, 2014 From the Korean Intellectual Property Office Re. Application No. PCT/KR2013/007622 and Its Translation of Search Report in English.

*Primary Examiner* — Dana Ross
*Assistant Examiner* — Joseph W Iskra

(57) ABSTRACT

The present invention relates to a juice extractor. The juice extractor of the present invention includes: a main body; a housing; a cover; a rotary brush mounted between an inner wall surface of the housing and an outer wall surface of the mesh drum, the rotary brush including at least one brush; and a feed screw connected with the drive shaft of the main body and disposed inside the mesh drum, wherein the feed screw includes a plurality of retaining slots formed on a lower circumferential bottom surface thereof and the rotary brush includes a plurality of engagement parts formed on an inner circumferential surface of a lower end portion thereof, so that the engagement parts of the rotary brush are engaged with the retaining slots of the feed screw to cause the rotary brush to be rotated together with the rotation of the feed screw.

13 Claims, 6 Drawing Sheets

(58) Field of Classification Search
USPC ......... 99/501, 502, 503, 513, 495, 509, 510;
100/117, 131, 145; 366/133, 157.3, 186,
366/194, 249, 266, 318; 241/24.11,
241/24.26, 82.1, 260.1, 282.1
See application file for complete search history.

(56) References Cited

FOREIGN PATENT DOCUMENTS

| | | |
|---|---|---|
| KR | 10-1101692 | 12/2011 |
| KR | 10-2012-0012040 | 2/2012 |
| KR | 10-2012-0048224 | 5/2012 |
| KR | 10-1159177 | 6/2012 |
| KR | 10-1181103 | 9/2012 |
| KR | 10-1267808 | 5/2013 |
| WO | WO 2014/196690 | 12/2014 |

\* cited by examiner (a)

(b)

(c)

JUICE EXTRACTOR

RELATED APPLICATIONS

This application is a National Phase of PCT Patent Application No. PCT/KR2013/007622 having International filing date of Aug. 26, 2013, which claims the benefit of priority of Korean Patent Application No. 10-2013-0065406 filed on Jun. 7, 2013. The contents of the above applications are all incorporated by reference as if fully set forth herein in their entirety.

FIELD AND BACKGROUND OF THE INVENTION

The present invention relates to a juice extractor which can extract juice from fruits or vegetables to make fruit juice or vegetable juice.

Recently, as people's interest in health is on the rise, there is a high tendency that they will directly extract juice from the vegetables, fruits, grains or the like which have been purchased using a juice extractor and take the extracted juice at home. The development of household juicers is in continuous progress.

When juice is made using the juice extractor, draff or residue of a raw material put into the extractor gets caught in mesh holes formed on a mesh drum inside the extractor, leading to a degradation of performance and efficiency of the extractor. Thus, a user suffers from an inconvenience of having to frequently disassemble and wash the juice extractor to remove the draff inside the extractor. In addition, since thick juice extracted from fruits having a high viscosity does not flow downwardly smoothly, it is difficult to extract juice from the fruits high in viscosity.

As an example of a technology for solving the above-mentioned problems, Korean Patent Registration No. 0755440 discloses a juice extractor which includes a rotary brush configured to continuously sweep the outer wall of the mesh drum so as to continuously remove draff caught in the mesh holes and to allow thick juice having a high viscosity to flow downwardly smoothly.

However, this conventional juice extractor adopts a complicated structure in which a screw gear is mounted at a lower portion of a feed screw, an intermediate gear is rotatably mounted at the bottom of a housing, and a rotary brush gear is mounted at a bottom of a rotary brush main body so that the screw gear, the intermediate gear, and the brush gear are engaged with one another to thereby rotate the rotary brush.

The juice extractor having a gear engagement structure entail the following several problems.

First, a failure rate of the juice extractor is high due to gear abrasion and damage. In addition, three kinds of gears are required to be precisely engaged with one another, and thus it is not easy assemble them.

In addition, a food processing apparatus such as the juicer essentially requires cleanliness at the inside thereof with which food comes into close contact. However, food accumulatively remains behind the apparatus and the apparatus becomes dirty due to draff caught between a plurality of gear teeth of the gear structure, which makes it difficult to clean the apparatus. In particular, since the intermediate gear securely fixed to the bottom of the housing is impossible to disassemble, it difficult to remove fine draff or stain caught in tooth gaps of gears, which causes a problem in maintaining cleanliness.

In an attempt to solve such problems, there is a continuous need for a juice extractor which is fundamentally improved to be operated smoothly while excluding the rotational power transmission structure based on the gear engagement in a manner of rotating the rotary brush.

Meanwhile, juice is extracted from a raw material put into the juice extractor and draff remaining in the extractor is discharged to the outside through a draff discharge hole formed at a bottom surface of the housing and a draff outlet port extending outwardly from a lower portion of the housing during the operation of the extractor. In this case, when raw materials (e.g., salaries, pineapples or the like) having a relatively long, tough and fibrous texture are used, a problem may occur in that the raw materials are hanging caught in the draff discharge hole. Likewise, in the case where draff is caught in the draff discharge hole, it is difficult for the draff itself to escape from the draff discharge hole in terms of a discharge structure, and thus a bottle neck phenomenon occurs at the draff discharge hole. Consequently, the smooth discharge of the draff is further difficult and a draff accumulation phenomenon is aggravated.

SUMMARY OF THE INVENTION

Accordingly, an object of the present invention is to provide a juice extractor which provides a novel type rotational power transmission structure, thereby reducing a failure rate of the extractor, enhancing assemblability of the extractor to promote productivity and user convenience, and improving cleanliness and hygiene of the extractor.

Another object of the present invention is to provide a juice extractor which can discharge draff smoothly.

To accomplish the above object, according to one embodiment of the present invention, there is provided a juice extractor including: a main body including a drive shaft configured to be rotated; a housing mounted on the main body and opened at a top thereof, the housing including a juice outlet port and a draff outlet port which are formed at a lower end portion thereof in such a manner as to be spaced apart from each other; a cover mounted on the housing to cover the opened top of the housing, and including an inlet port formed at a side of an upper portion thereof; a mesh drum mounted inside the housing and opened at the top and bottom thereof, the mesh drum including a plurality of mesh holes formed on the sidewall thereof; a rotary brush mounted between an inner wall surface of the housing and an outer wall surface of the mesh drum and opened at the top and bottom thereof, the rotary brush including at least one brush configured to continuously sweep at least one of the inner wall surface of the housing and the outer wall surface of the mesh drum while being rotated; and a feed screw connected with the drive shaft of the main body so as to be rotatably mounted on the main body and disposed inside the mesh drum, the feed screw including one or more screw spirals formed on an outer surface thereof, wherein the feed screw includes a plurality of retaining slots formed on a lower circumferential bottom surface thereof and the rotary brush includes a plurality of engagement parts formed on an inner circumferential surface of a lower end portion thereof so as to extend inwardly from the rotary brush, so that the engagement parts of the rotary brush are engaged with the retaining slots of the feed screw to cause the rotary brush to be rotated together with the rotation of the feed screw.

In this embodiment, each of the engagement parts formed on the rotary brush includes an arm horizontally extending toward the center of the rotary brush from the inner circumferential surface of the lower end portion of the rotary brush by a predetermined length, and a retaining lug vertically extending bent upwardly from an end of the arm by a predetermined length so that the retaining lug is insertingly engaged with each of the retaining slots of the feed screw.

Preferably, the engagement parts are formed on the inner circumferential surface of the lower end portion of the rotary brush in such a manner as to be spaced apart from one another at predetermined angle intervals, more preferably four engagement parts may be formed on the inner circumferential surface of the lower end portion of the rotary brush in such a manner as to be spaced apart from one another at 90° intervals around the central axis of the screw.

In this embodiment, the housing includes a draff descending hole formed on a bottom surface thereof so as to fluidically communicate with the draff outlet port.

In this embodiment, the housing includes a draff discharge guide recess formed on the bottom surface thereof so as to guide draff to the draff descending hole as the feed screw is rotated, the draff discharge guide recess being formed in a circular arcuate shape such that it starts at a predetermined point of the bottom surface of the housing and ends at the draff descending hole.

Preferably, the draff discharge guide recess is formed such that it is gradually increased in depth or width as it goes toward the draff descending hole.

Preferably, the horizontally extending portions, i.e., the arms of the engagement parts formed on the rotary brush are rotated while pushingly moving the draff accumulated on the bottom surface of the housing along the draff discharge guide recess.

In this embodiment, the each arm is formed at a position corresponding to that of the draff descending hole so that when the rotary brush is rotated, the lower end surface of the arm grazes the upper end surface of the draff descending hole while intersecting the upper end surface of the draff descending hole.

Preferably, no gap is formed between the lower end surface of the arm and the upper end surface of the draff descending hole. When the arm reaches a position of the draff descending hole, draff hanging caught in the draff descending hole without being discharged to the draff descending hole is cut off by the cutting action due to the intersection between the lower end surface of the arm and the upper end surface of the draff descending hole.

More specifically, on the upper end surface of the draff descending hole, there are positioned one end which first meets a front end of the lower end surface of the arm during the rotation of the arm, and the other end which later meets the front end of the lower end surface of the arm after passing by the one end during the further rotation of the arm. The cutting of the draff is carried out when the front end of the lower end surface of the arm intersects the other end of the upper end surface of the draff descending hole.

Preferably, a horizontal cross-section of the draff descending hole is formed in a trapezoidal or parallelogram shape so that the front end of the lower end surface of the arm and the other end of the upper end surface of the draff descending hole intersect each other while forming a slope. Thus, when the arm is rotated, the front end of the lower end surface of the arm and the other end of the upper end surface of the draff descending hole which is grazed by the lower end surface of the arm can intersect each other while sequentially forming an intersecting contact point.

In the case where the horizontal cross-section of the draff descending hole is formed in a trapezoidal or parallelogram shape, the same cutting effect as that of a pair of scissors can be further enhanced. In addition, a horizontal cross-section of the arm may also be formed in a trapezoidal or parallelogram shape so that the front end of the lower end surface of the arm and the other end of the upper end surface of the draff descending hole intersect each other while forming a slope. In this case, the horizontal cross-section of the arm may be formed in an opposed direction to the trapezoidal or parallelogram shape of the upper end surface of the draff descending hole.

In addition, preferably, a stationary blade may be mounted on the bottom surface of the housing so as to be in close contact with the upper end surface of one side of the draff descending hole confronting the arm. When the lower end surface of the arm intersects the upper end surface the stationary blade, the cutting of the draff can be more effectively carried out. The stationary blade may be made of stainless steel or ceramic material which is rigid and rust-proof.

In this embodiment, the housing includes a hollow through-part formed protrudingly upwardly at the center of the bottom surface thereof and having a through-hole formed at the center of an upper portion thereof. A packing having a waterproof function is mounted in the through-hole.

In this embodiment, a draff inflow space is formed inside the lower portion of the feed screw so that when an internal pressure of the lower portion of the feed screw is high due to juice or draff which is not discharged, the juice or draff can be introduced into the draff inflow space. Such a buffer space (i.e., pressure absorbing space) is secured so that the feed screw and the rotary brush can be prevented from being lifted upwardly due to an inflow pressure of the draff accumulated on the bottom surface thereof. In the case where the rotary brush is lifted upwardly, a gap is formed the lower end surface of the arm and the upper end surface of the draff descending hole, thereby greatly reducing the draff cutting effect.

Preferably, the draff inflow space is formed in an annular shape around the drive shaft hole in such a manner as to be spaced apart from the top surface of the hollow through-part.

In this embodiment, the cover includes a plurality of retaining projections formed on the inner circumferential surface of a lower portion thereof in such a manner as to be spaced apart from one another at predetermined angle intervals, and the mesh drum includes a plurality of retaining parts formed on the outer circumferential surface of an upper portion thereof to have angle intervals corresponding to those of the retaining projections, so that when the retaining parts are fittingly engaged between the retaining projections and are turned in the engaged state, they can be prevented from being moved by the retaining projections, thereby maintaining a fine gap between the lower end of the mesh drum and the upper end surface of the arm of a rotary cutting member.

In this embodiment, the housing includes a plurality of retaining recesses formed on the inner circumferential surface of an upper portion thereof in such a manner as to be spaced apart from one another at predetermined angle intervals, and the mesh drum has a plurality of retaining projection parts formed on the outer circumferential surface of an upper portion thereof to have angle intervals corresponding to those of the retaining recesses, so that when the retaining projections of the mesh drum is fittingly engaged with the retaining recesses of the housing, the mesh drum is prevented from being displaced, thereby maintaining a fine gap between the lower end of the mesh drum and the upper end surface of the arm of the rotary cutting member.

The juice extractor in accordance with an embodiment of the present invention as constructed above have the following advantages.

The feed screw and the rotary brush are directed coupled to each other by a simple engagement structure so that the rotary brush can be rotated together with the rotation of the feed screw, thereby relatively significantly reducing the number of parts assembled as compared to the conventional juice extractor employing an intermediate gear or the like for transmitting a driving force to the rotary brush.

In addition, the rotary brush is directly rotated by the feed screw so that a complicated gear engagement structure can be excluded, thereby reducing a failure rate caused by damage or abrasion of parts such as a gear and the like.

Further, the parts of the juice extractor have a structure that is not complicated but is simplified. Thus, the parts can be simply assembled without an inconvenience having to engage the gears in a precise engagement relation during the assembly of the parts, thereby improving inconvenience of the user.

Furthermore, the necessity for a gear structure formed at the lower end portion of the feed screw, an intermediate gear rotatably mounted at the bottom of the housing, and a gear formed at the lower end portion of the rotary brush main body is eliminated so that the shape of the parts is simplified to make it possible to clean the parts in an easy and convenient manner. As a result, the juice extractor can be used in a hygienic and cleanly state.

Moreover, in the case where the draff discharged through the opened bottom of the mesh drum is caught in the draff descending hole, it is cut off by the cutting action of the arms provided at the lower end portion of the rotary brush during the rotation of the rotary brush so that the draff can be further smoothly discharged without being accumulated.

These effects of the invention are naturally exhibited by the construction of the invention irrespective of whether or not the inventor recognizes the effects. Therefore, the aforementioned effects are merely examples of several effects achieved according to the present invention, and should not be admitted as all the effects which are understood by the inventor or exist substantially. In addition, the effects of the present invention should be understood additionally by the entire disclosure of the specification. Although the effects of the present invention have not been described explicitly herein, they should be considered to be effects described herein as long as the present invention can be admitted as having such effects through this specification by a person having an ordinary skill in the art.

BRIEF DESCRIPTION OF THE SEVERAL VIEWS OF THE DRAWINGS

The above objects, other features and advantages of the present invention will become more apparent by describing the preferred embodiments thereof with reference to the accompanying drawings, in which.

EXPLANATION ON REFERENCE NUMERALS OF MAIN ELEMENTS IN THE DRAWINGS

Figure 1:
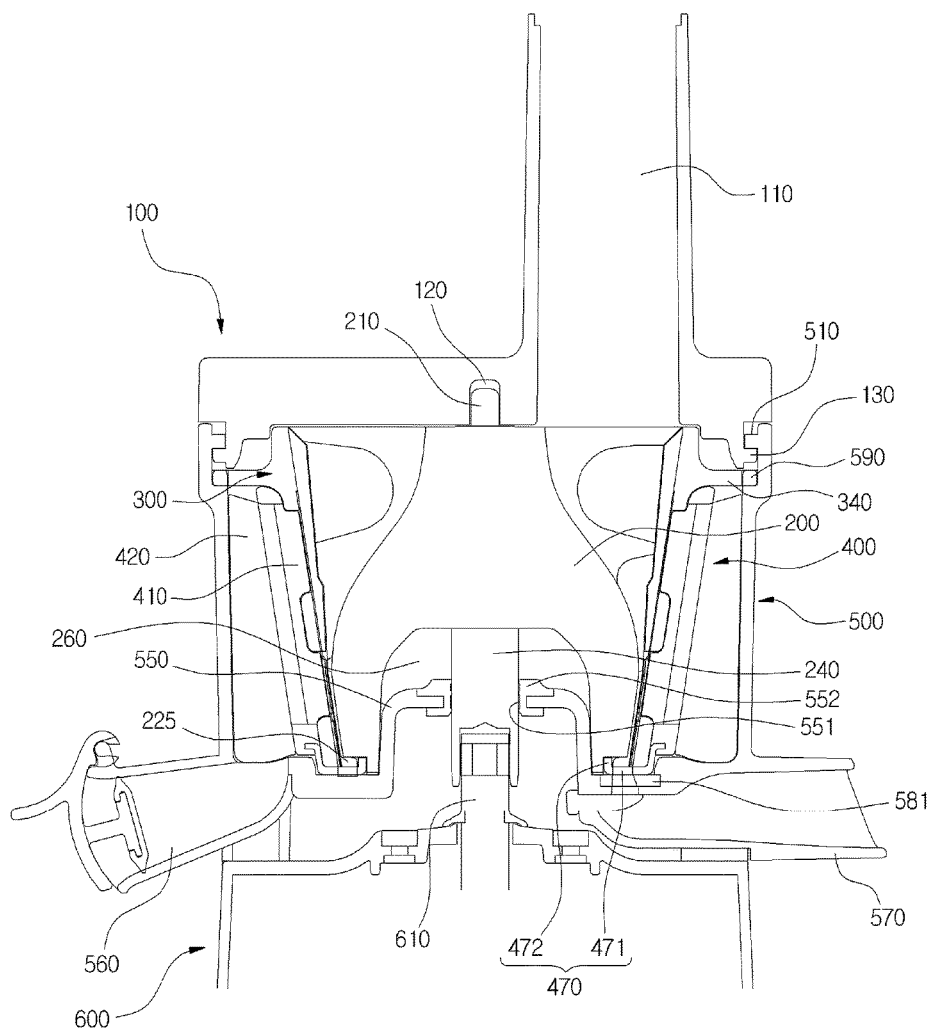
FIG. 1 is a schematic cross-sectional view showing a juice extractor in accordance with a first embodiment of the present invention.

| | |
|---|---|
| 100: cover | 110: inlet port |
| 120: rotary shaft hole | 130: engagement jaw |
| 140: retaining projections | 200: feed screw |
| 210: upper rotary shaft | 220: screw spirals |
| 225: discharge jaw | 230: drive shaft hole |
| 240: lower rotary shaft | 250: retaining slot |
| 260: draff inflow space | 300: mesh drum |
| 320: mesh holes | 330: retaining parts |
| 340: retaining projections parts | 400: rotary brush |
| 410: mesh brush | 420: housing brush |
| 430: brush main body | 470: engagement part |
| 471: arm | 472: retaining lugs |
| 500: housing | 510: engagement projection |
| 520: bottom surface | 521: draff discharge guide recess |
| 550: hollow through-part | 551: through-hole |
| 552: packing | 560: juice outlet port |
| 570: draff outlet port | 580: draff descending hole |
| 581: stationary blade | 590: retaining recess |
| 600: main body | 610: drive shaft |

DESCRIPTION OF SPECIFIC EMBODIMENTS OF THE INVENTION

Now, preferred embodiments of the present invention will be described in detail with reference to the accompanying drawings.

Here, the terms or words used in the specification and the claims of the present invention should not be construed as being typical or dictionary meanings, but should be construed as meanings and concepts conforming to the technical spirit of the present invention on the basis of the principle that an inventor can properly define the concepts of the terms in order to described his or her invention in the best way. Therefore, embodiments described herein and configurations illustrated in the drawings are merely the most preferred embodiments of the present invention, and do not represent all of the technical spirits of the present invention. So, it should be understood that various equivalents or modifications which may replace the embodiments could exist at a time point of the application of the present invention.

Figure 2:
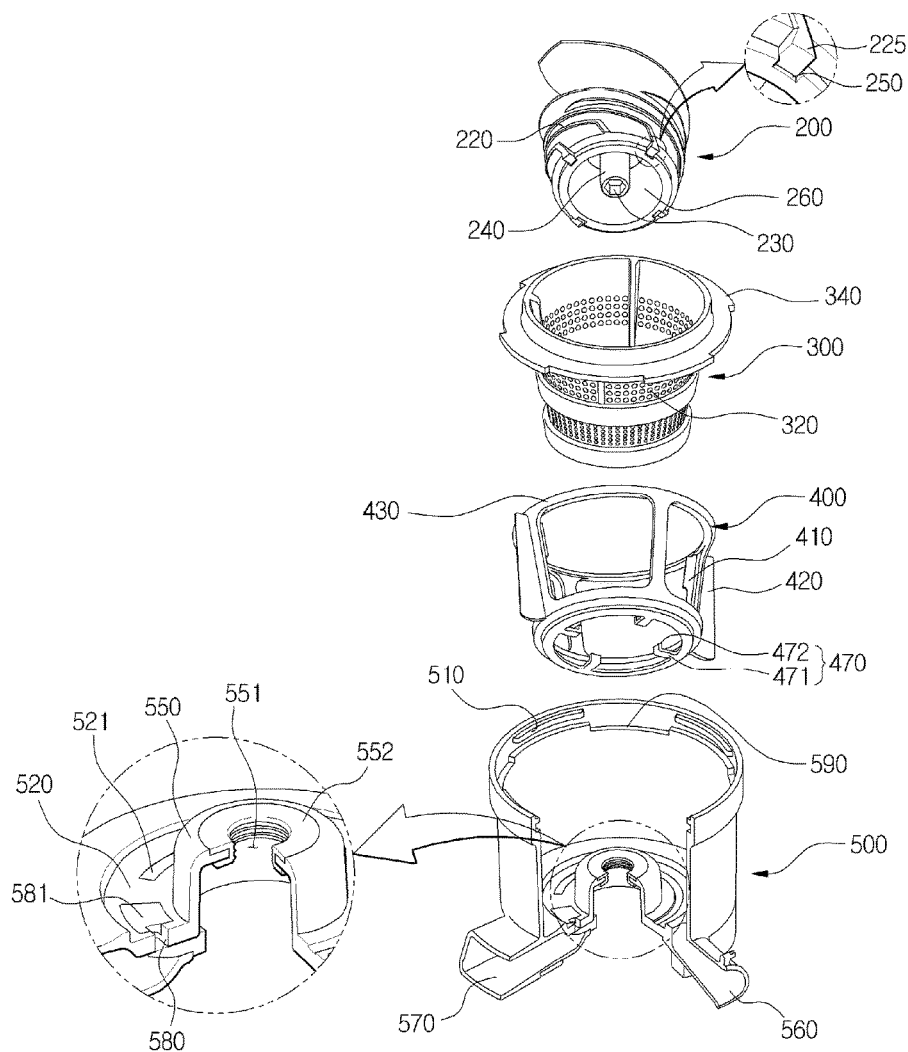
FIG. 2 is an exploded perspective view showing a juice extractor in accordance with a first embodiment of the present invention.

As shown in FIGS. 1 and 2, a juice extractor in accordance with a first embodiment of the present invention includes a cover 100, a feed screw 200, a mesh drum 300, a rotary brush 400, a housing 500, and a main body 600.

First, the main body 600 is provided with a drive shaft 610 which protrudes upwardly so as to be inserted into a drive shaft hole 230 of the screw 200 and engaged with a lower rotary shaft 240 of the screw 200.

The drive shaft 610 is connected to a motor (not shown) and a speed reducer (not shown) so that it rotates the screw 200 at low speed while being rotated at low speed. But, the drive shaft and the feed screw may have any shape as long as they are directly or indirectly connected to each other to allow the drive shaft to transmit a driving force to the screw. The engagement structure between the drive shaft and the screw is always not limited to one in which the drive shaft protrudes upwardly from an upper portion of the main body so that it is connected with a lower portion of the feed screw. For example, although not shown, the drive shaft may be connected with an upper portion of the feed screw to transmit a driving force to the screw.

The housing 500 is mounted on the main body 600, and serves to accommodate the feed screw 200 and the mesh drum 300 therein. The housing 500 is opened at a top thereof and includes a juice outlet port 560 and a draff outlet port 570 which are formed at a lower end portion thereof in such a manner as to be spaced apart from each other. The draff outlet port 570 fluidically communicate with a draff descending hole 580 formed on a bottom surface 520 of the housing 500.

The housing 500 includes a hollow through-part 550 formed protrudingly upwardly at the center of the bottom surface 520 thereof. The hollow through-part 550 has a through-hole 551 formed at the center of an upper portion thereof so that the feed screw 200 can be connected with the drive shaft 610 of the main body 600 through the through-hole 551. Thus, juice can be prevented from being introduced into the through-hole 551 of the hollow through-part 550 from the bottom surface 520 of the housing 500. Further, a packing 552 made of a soft material such as rubber or silicone is mounted in the through-hole 551 of the hollow through-part 550 to exhibit a waterproof function, thereby more efficiently preventing the juice from leaking to the outside of the housing 500.

A draff discharge guide recess 521 is formed on the bottom surface 520 of the housing 500 so as to guide draff to the draff descending hole 580 as the feed screw 200 is rotated. The draff discharge guide recess 521 may be formed in a circular arcuate shape such that it starts at a predetermined point of the bottom surface 520 of the housing 500 and ends at the draff descending hole 580. In addition, the draff discharge guide recess 521 may be formed such that it is gradually increased in depth or width as it goes toward the draff descending hole 580 so that the draff can be discharged smoothly.

A lower portion of the cover 100 is shaped to correspond to a shape of the top of the housing 500 to cover the opened top of the housing 500, and the cover 100 is opened at a bottom thereof. The cover 100 includes a cylindrical inlet port 110 formed protrudingly upwardly from a side of the top surface thereof in such a manner as to penetrate through the opened bottom of the cover 100 so that a raw material can be put into the inlet port 110.

A rotary shaft hole 120 is formed at the center of the underside of the cover 100 so as to allow an upper rotary shaft 210 of the feed screw 200 is inserted into the rotary shaft hole 120. The rotary shaft hole 120 is preferably formed at the center of the cover 100, and the inlet port 110 is formed at a position deviated by a given distance from the center of the cover 100, where the rotary shaft hole 120 is positioned so that the rotation of the feed screw 200 and the charge of the raw material into the inlet port 110 can be carried out smoothly.

A plurality of engagement jaws 130 is protrudingly formed on an outer peripheral edge of a lower end portion of the cover 100, and a plurality of engagement projections 510 is formed on an inner peripheral surface of an upper end portion of the housing 500 so that the engagement jaws 130 are engaged with the engagement projections 510 to cause the cover 100 to be detachably coupled to the housing 500.

The mesh drum 300 is formed in a cylindrical shape which is gradually reduced in diameter as it goes toward the bottom from the top. The mesh drum 300 is opened at the top and bottom thereof and is disposed inside the housing 500.

A plurality of mesh holes 320 is formed on the sidewall of the mesh drum 300 so that after the raw material put into the mesh drum 300 through the inlet port 110 is compressed, squeezed, and crushed to produce juice as the feed screw is rotated, the produced juice passes through the mesh holes 320.

In the present invention, since the bottom surface of the mesh drum 300 is opened, the draff descending hole 580 comes into close contact with the underside of the feed screw 200 and thus the draff discharge guide recess 521 comes into close contact with the underside of the feed screw 200 unlike a conventional juice extractor (see Korean Patent Registration No. 0798352) in which the draff is discharged to the outside through a mesh drum discharge hole formed at a lower end of a mesh drum. Thus, in the conventional juice extractor, since the mesh drum discharge hole is required to fluidically communicate with the draff descending hole of the housing, there is an inconvenience of having to assemble the juice extractor in such a manner that the mesh drum discharge hole correctly coincides with the draff descending hole of the housing. On the contrary, in the juice extractor of the present invention, the mesh drum 300 and the housing 500 are more easily assembled with each other. In addition, in the conventional juice extractor, after the draff passes through the mesh drum discharge hole, it is discharged to the draff descending hole. Thus, if the draff contains a fibrous material in large amount, it is difficult for the draff to pass through the mesh drum discharge hole smoothly. As a result, the draff is not discharged well and the juice extraction is difficult. On the other hand, the present invention adopts a structure in which draff is directly discharged to the draff descending hole 580 through the opened bottom of the mesh drum 300 so that the discharge of the draff is smoothly carried out.

The rotary brush 400 is mounted between the housing 500 and the mesh drum 30, and is opened at the top and bottom thereof. The rotary brush 400 is configured to continuously sweep the inner surface of the housing 500 and the outer surface of the mesh drum 300 while being rotated. The rotary brush 400 is preferably composed of a brush main body 430, a housing brush 420, and a mesh brush 410.

Although it has been shown that the housing brush 420 or the mesh brush 410 is vertically formed on the outer surface of the brush main body 430, the housing brush 420 or the mesh brush 410 may be formed to be inclined toward the front with respect to the upper portion of the brush main body 430 and the rotation direction of the feed screw 200 so that juice extracted from the raw material can flow downwardly well in a vertical direction.

The upper rotary shaft 210, which is formed at the center of an upper end portion of the feed screw 200, is inserted into the rotary shaft hole 120 of the cover 100 so as to be rotated. A plurality of screw spirals 220, which are in close contact with the inner wall of the mesh drum 300, are formed on an outer surface of the feed screw 200. At the center of a lower portion of the screw 200, there is provided a lower rotary shaft 240 having a drive shaft hole 230 formed therein.

A discharge jaw 225 is formed on the outer peripheral surface of a lower end portion of the feed screw 200 in such a manner as to be relatively more inclined in a vertical direction than the screw spirals 220 while extending from the screw spirals 220. The discharge jaw 225 serves to guide draff collected on the bottom surface 520 of the housing 500 to cause the draff to be finally discharged to the draff descending hole 580.

In the meantime, in the present invention, parts such as a gear are not used for a rotational force of the rotary brush 400; instead, the feed screw 200 is directly connected to the rotary brush 400 so that the rotational force itself of the feed screw 200 is directly transmitted to the rotary brush 400. To this end, a plurality of retaining slots 250 is formed on a lower circumferential bottom surface of the feed screw 200 in such a manner as to be spaced apart from one another at predetermined angle intervals, and a plurality of engagement parts 470 is formed on an inner circumferential surface of a lower end portion of the rotary brush 400 to correspond to the plurality of retaining slots 250 in such a manner as to be spaced apart from one another at predetermined angle intervals, so that the engagement parts 470 of the rotary brush 400 are engaged with the retaining slots of the feed screw 200. Thus, when the feed screw 200 is rotated, the rotary brush 400 is rotated together with the feed screw 200.

Herein, the retaining slots 250 of the feed screw 200 may selectively form on a circumferential bottom surface, an outer circumferential surface, or an inner circumferential surface of the lower end portion of screw 200. In this case, the engagement parts 470 of the rotary brush 400 may be configured to be engaged with the retaining slots 250 of the feed screw 200 by properly modifying the length or shape thereof.

Each of the engagement parts 470 of the rotary brush 400 consists of an arm 471 horizontally extending toward the center of the rotary brush 400 from the inner circumferential surface of the lower end portion of the rotary brush 400 by a predetermined length, and a retaining lug 472 extending bent upwardly from an end of the arm 471 by a predetermined length. The retaining lug 472 is inserted into the retaining slot 250 formed on the feed screw 200 so that the feed screw 200 is engaged with the rotary brush 400.

In one embodiment of the present invention, four retaining slots 250 are formed on the lower circumferential end surface of the feed screw 200 in such a manner as to be spaced apart from one another at 90° intervals around the central axis of the screw 200, and four engagement parts 470 are formed on the inner circumferential surface of the lower end portion of the rotary brush 400 to correspond to the four retaining slots 250 in such a manner as to be spaced apart from one another at 90° intervals around the central axis of the rotary brush so that the four engagement parts 470 can be insertingly engaged with the four retaining slots 250.

Thus, when the engagement parts 470, preferably the retaining lugs 472 of the rotary brush 400 are engaged with the retaining slots 250 of the feed screw 200, a rotational force of the feed screw 200 is transmitted to the rotary brush 400 to cause the rotary brush 400 to be rotated together with the rotation of the feed screw 200.

In the meantime, on the contrary to the foregoing description, the feed screw 200 and the rotary brush 400 may be configured such that the engagement parts are formed on the feed screw 200 and the retaining slots are formed on the rotary brush 400 so that the feed screw 200 can be engaged with the rotary brush 400. In other words, a plurality of arms is formed to extend protrudingly radially from the lower end of the feed screw 200 and a plurality of retaining lugs is formed to extend bent upwardly or downwardly from the ends of the arms by a predetermined length so that the retaining lugs can be inserted into the retaining slots of the rotary brush 400.

Herein, besides the aforementioned configuration, various methods may be used as configurations for directly transmitting the rotational force of the feed screw 200 to the rotary brush 400, and the engagement structure between the retaining slots 250 and the engagement parts 470 is merely an example.

Likewise, by virtue of the simple engagement structure between the feed screw 200 and the rotary brush 400, the feed screw 200 and the rotary brush 400 may be configured such that the rotary brush 400 can be rotated together with the rotation of the feed screw 200. Thus, the number of parts assembled inside the juice extractor can be relatively significantly reduced as compared to the conventional juice extractor employing an intermediate gear or the like as a means for rotating the rotary brush 400.

In addition, the rotary brush 400 is directly rotated by the feed screw 200, thereby reducing a failure rate due to damage or abrasion of parts such as a gear and the like unlike the complicated gear engagement structure of the conventional juice extractor.

Furthermore, the necessity for a gear structure formed at the lower end portion of the feed screw, an intermediate gear rotatably mounted at the bottom of the housing, and a gear formed at the lower end portion of the rotary brush main body is eliminated so that the shape of the parts is simplified to make it possible to clean the parts in an easy and convenient manner. As a result, the juice extractor can be always used in a hygienic and cleanly state.

Meanwhile, the juice extractor of the present invention is constructed such that the draff caught in the draff descending hole 580 of the housing 500 is cut off using the aforementioned engagement structure between the feed screw 200 and the rotary brush 400, thereby improving the draff discharge efficiency by the draff descending hole 580.

In other words, horizontal extending parts, i.e., the arms 471 of the engagement parts 470 provided at the lower end portion of the rotary brush 400 pushingly move the draff accumulated on the bottom surface 520 of the housing 500 along a draff discharge guide recess 521 formed on the bottom surface 520 while being rotated together with the rotation of the feed screw 200. Thus, the arms 471 are formed to correspond to the draff descending hole 580.

When the rotary brush 400 continues to be rotated, the lower end surfaces of the arms 471 graze the upper end surface of the draff descending hole 580 to cause the draff caught in the draff descending hole 580 to be cut off so that the smooth discharge of the draff can be carried out.

As described above, according to the present invention, draff remained after the juice extraction is moved downwardly along the feed screw 200, and discharge jaws 225 formed at the lower portion of the feed screw 200 circumferentially move draff accumulated on the bottom surface 520 of housing 500 as the feed screw 200 is rotated so that the draff is discharged to the draff descending hole 580.

Figure 3:
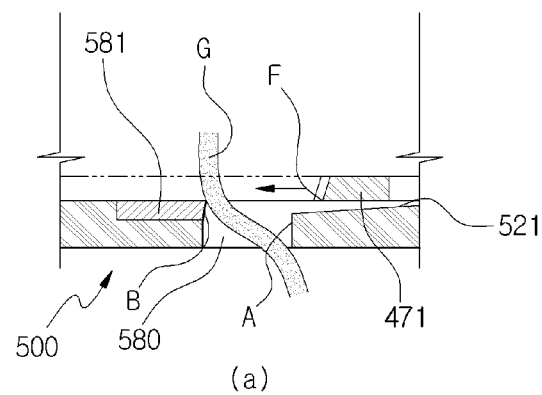
FIGS. 3(a), 3(b) and 3(c) are cross-sectional views sequentially showing a process in which draff caught in a draff descending hole is cut off by the draff descending hole and an arm of a juice extractor in accordance with a first embodiment of the present invention.
Figure 3:
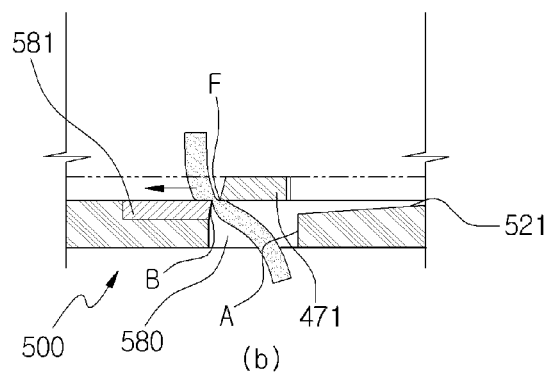
Figure 3:
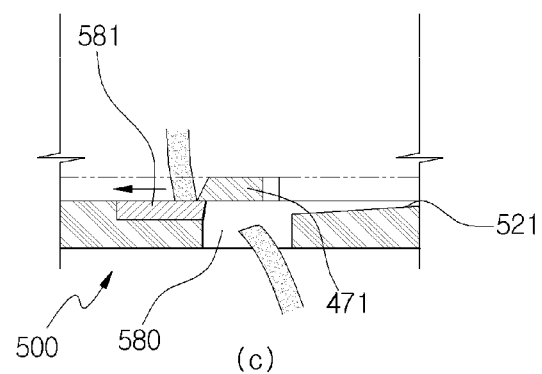

As shown in FIGS. 3(a), 3(b) and 3(c), no gap may be formed between the lower end surface of the arm 471 and the upper end surface of the draff descending hole 580. If any gap is formed therebetween, a draff cutting efficiency is disadvantageously degraded.

The arm 471 is moved along the draff discharge guide recess 521 as shown in FIG. 3(a). Thereafter, when the arm 471 reaches a position of the draff descending hole 580 as shown in FIG. 3(b), draff (G) hanging caught in the draff descending hole 580 without being discharged to the draff descending hole is cut off by the cutting action due to the intersection between the lower end surface of the arm 471 and the upper end surface of the draff descending hole 580 as shown in FIG. 3(c). Thus cut draff (G) is discharged to the outside through the draff outlet port 570 via the draff descending hole 580.

More specifically, on the upper end surface of the draff descending hole 580, there are positioned one end (A) which first meets a front end (F) of the lower end surface of the arm 471 during the rotation of the arm 471, and the other end (B) which later meets the front end (F) of the lower end surface of the arm 471 after passing by the one end (A) during the further rotation of the arm 471. The cutting of the draff is carried out when the front end (F) of the lower end surface of the arm 471 intersects the other end (B) of the upper end surface of the draff descending hole 580.

In this case, the vertical cross-section of the arm 471 has a trapezoidal shape. The front end (F) of the lower end surface of the arm 471 may be formed to be protruded in the rotation progress direction of the arm 471, and the other end (B) of the draff descending hole 580, which corresponds to the front end (F) of the lower end surface of the arm 471, has a vertical cross-section of a trapezoidal shape and may be formed to be protruded at an upper tip thereof toward the arm 471. In addition, the front end (F) of the lower end surface of the arm 471 and the other end (B) of the upper end surface of the draff descending hole 580 may intersect with each other in a parallel relation to each other.

Figure 4:
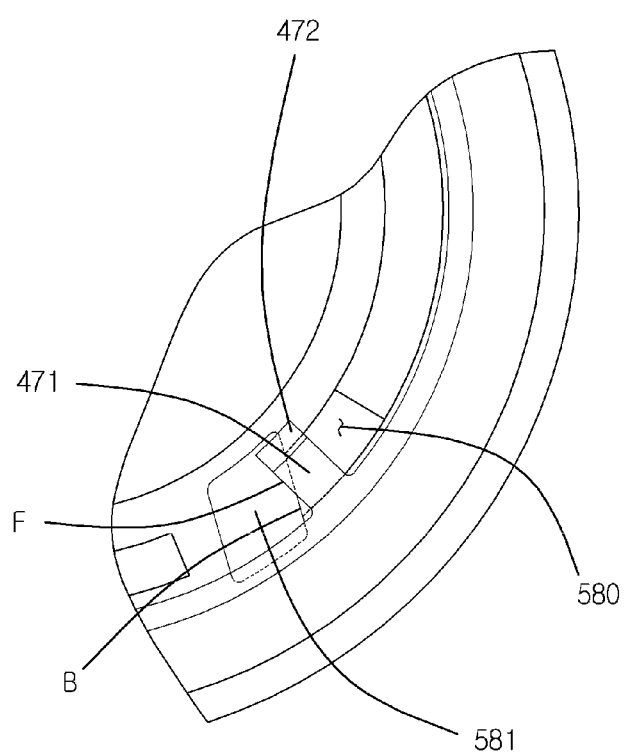
FIG. 4 is a top plan view showing a draff descending hole and an arm of a juice extractor in accordance with a first embodiment of the present invention.

However, preferably, as shown in FIG. 4, when the rotary brush 400 is rotated, the front end (F) of the lower end surface of the arm 471 rotating together with the rotary brush 400 and the other end (B) of the upper end surface of the draff descending hole 580 which is grazed by the lower end surface of the arm 471 can intersect each other while sequentially forming an intersecting contact point, so that a cutting force is maximized at the intersecting contact point to further enhance a cutting effect. To this end, the draff descending hole 580 and/or the arm 471 may have a horizontal cross-section of a trapezoidal or parallelogram shape.

This cutting effect can be exhibited usefully when juice is extracted from raw materials, for example, salaries, pineapples or the like having a relatively long, tough and fibrous texture.

In order to maximize the cutting effect, a stationary blade 581 may be mounted on the bottom surface 520 of the housing 500 so as to be in close contact with the upper end surface of the other end of the draff descending hole 580. When the lower end surface of the arm 471 and the stationary blade 581 intersect each other, the cutting of the draff can be more effectively performed. Preferably, the stationary blade 581 may be made of alloy steel such as stainless steel, ceramic material or the like, which is harmless to the human body, and is rigid and rustproof. In addition, the stationary blade 581 may be implemented as a detachable structure that can be disassembled from and assembled to the draff descending hole 580 so as to replace the stationary blade with new one at the time of abrasion thereof or facilitate the cleaning thereof.

In the meantime, in the juice extraction process according to the rotation of the feed screw 200, when draff is accumulated between the underside of the feed screw 200 and the bottom surface 520 of the housing 500, there may occur a phenomenon in which the feed screw 200 is lifted upwardly by an inflow pressure of the draff. For this reason, the feed screw 200 may apply a pressure to the inner surface of the cover 100 to make it difficult to open the cover 100 or a load may be applied to the juice extractor. In addition, the rotary brush 400 also becomes loose, and thus a gap between the arm 471 and the draff descending hole 580 is widened, leading to a great reduction in the draff cutting effect.

Accordingly, the inventive juice extractor may be constructed such that the central inner surface of the feed screw 200, which accommodates the hollow through-part 550 of the housing 500, is spaced apart from the top surface of the hollow through-part 550 of the housing 500 so that the central inner surface of the feed screw 200 and the top surface of the hollow through-part 550 define an annular draff inflow space 260 therebetween. By virtue of this construction, the draff accumulated on the underside of the feed screw 200 does not continue to be accumulated on the underside of the feed screw 200 and the bottom surface 520 of the housing 500, but is piled up along the sidewall of the hollow through-part 550 of the housing 500 so that the draff can be moved to and stored in the draff inflow space 260. Like this, the draff inflow space 260 performs a sort of buffer function (i.e., pressure absorbing function) so that a phenomenon can be prevented in which the feed screw 200 is lifted upwardly by the inflow pressure of the draff. Further, the inventive juice extractor is advantageous in terms of the manufacturing cost reduction due to a reduction in a material of which the feed screw 200 is made, and no gap is formed between the lower end surface of the arm 417 of the rotary brush 400 and the upper end surface of the draff descending hole 580 of the housing 500.

In the meantime, when a raw material is transferred to a lower portion of the mesh drum 300 along with the rotation of the feed screw 200, a pressure is generated, which affects the mesh drum 300 so that a phenomenon may occur in which the mesh drum 300 is likely to be moved to the lower portion of the mesh drum 300, at which time, the lower end of the mesh drum 300 presses the top surface of the arm 471. Thus, the rotation of the arm 471 is hindered, and there is a risk that the stationary blade 581 and the arm 471 will be abraded and damaged.

Thus, as shown in FIGS. 1 and 2, according to the present invention, the housing 500 has a plurality of retaining recesses 590 formed on the inner circumferential surface of an upper portion thereof in such a manner as to be spaced apart from one another at predetermined angle intervals, and the mesh drum 300 has a plurality of retaining projection parts 340 formed on the outer circumferential surface of an upper portion thereof to have angle intervals corresponding to those of the retaining recesses 590, so that when the retaining projection parts 340 of the mesh drum 300 are fittingly engaged with the retaining recesses 590 of the housing 500 at the time of mounting the mesh drum 300 inside the housing 500, a phenomenon can be prevented in which the mesh drum is displaced depending on a change in pressure according to the rotation of the feed screw 200. For this reason, a gap between the lower end of the mesh drum 300 and the top surface of the arms 471 can be maintained constantly, and thus the cutting action of the stationary blade 581 and the arms 471 can be correctly performed without being affected by the mesh drum 300. In addition, by virtue of this construction, the mesh drum 300 is firmly fixed to the housing so that the mesh drum 300 can be prevented from being rotated together with the feed screw 200 even at the time of rotation of the feed screw 200 to achieve smooth juice extraction.

Figure 5:
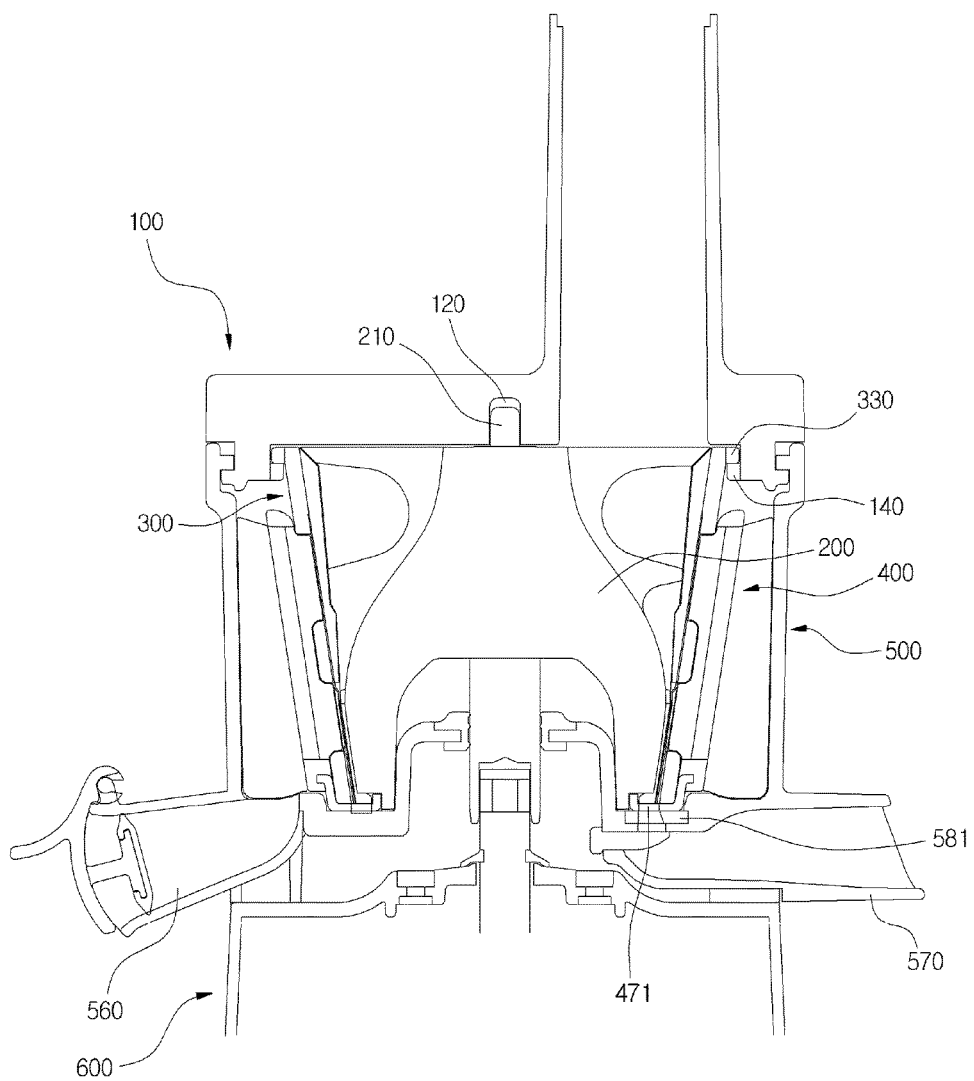
FIG. 5 is schematic cross-sectional view showing a juice extractor in accordance with a second embodiment of the present invention.
Figure 6:
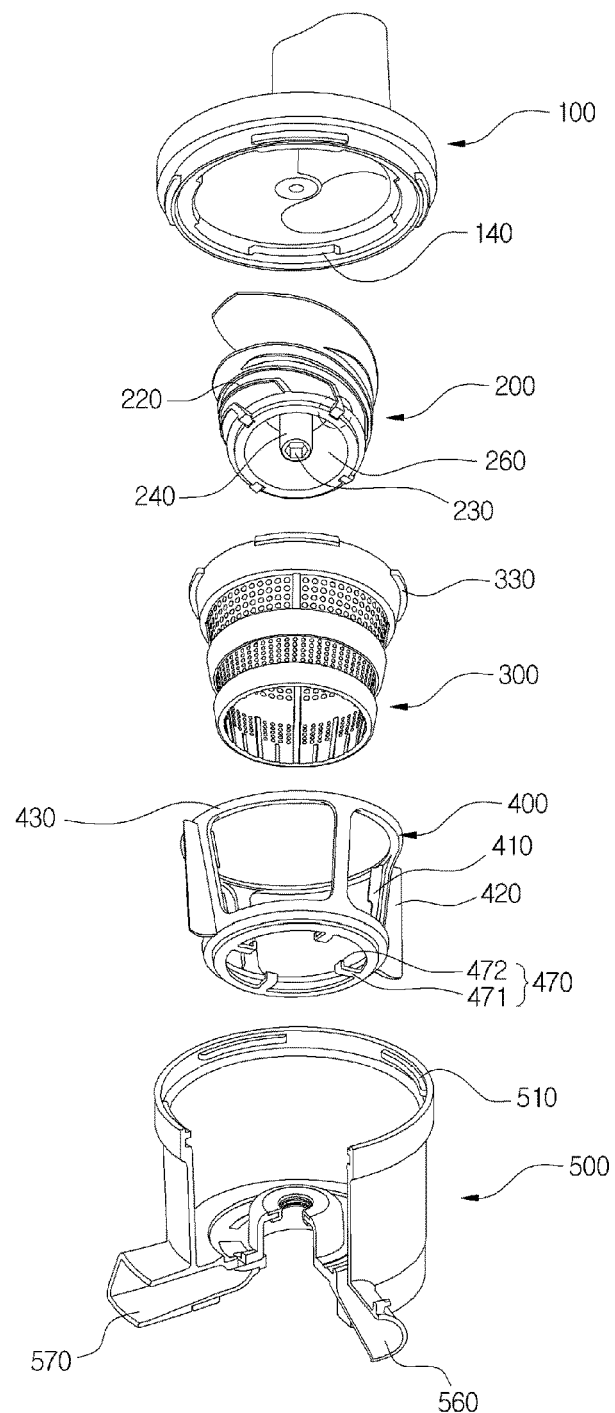
FIG. 6 is an exploded perspective view showing a juice extractor in accordance with a second embodiment of the present invention.

FIGS. 5 and 6 show another embodiment in which the movement of the mesh drum is prevented. The cover 100 has a plurality of retaining projections 140 formed on the inner circumferential surface of a lower portion thereof in such a manner as to be spaced apart from one another at predetermined angle intervals, and the mesh drum 300 has a plurality of retaining parts 330 formed on the outer circumferential surface of an upper portion thereof to have angle intervals corresponding to those of the retaining projections 140, so that when the retaining parts 330 of the mesh drum 300 are fittingly engaged between the retaining projections 140 of the cover 100 and are turned in a state in which they are positioned behind the retaining projections 140 of the cover 100, they are placed on the top surface of the retaining projections 140, thereby preventing the mesh drum 300 from being displaced depending on a change in pressure according to the rotation of the feed screw 200. For this reason, a distance between the lower end of the mesh drum 300 and the top surface of the arms 471 can be maintained constantly, and thus the cutting action of the stationary blade 581 and the arms 471 can be always correctly performed without being affected by the mesh drum 300. In addition, the mesh drum 300 is firmly fixed to the housing so that the mesh drum 300 can be prevented from being rotated together with the feed screw 200 even at the time of rotation of the feed screw 200 to achieve smooth juice extraction.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

What is claimed is:

1. A juice extractor comprising:
    a main body including a drive shaft configured to be rotated;
    a housing mounted on the main body and opened at a top thereof, the housing including a juice outlet port and a draff outlet port which are formed at a lower end portion thereof in such a manner as to be spaced apart from each other;
    a cover mounted on the housing to cover the opened top of the housing, and including an inlet port formed at a side of an upper portion thereof;
    a mesh drum mounted inside the housing and opened at the top and bottom thereof, the mesh drum including a plurality of mesh holes formed on the sidewall thereof;
    a rotary brush mounted between an inner wall surface of the housing and an outer wall surface of the mesh drum and opened at the top and bottom thereof, the rotary brush including at least one brush configured to continuously sweep at least one of the inner wall surface of the housing and the outer wall surface of the mesh drum while being rotated; and
    a feed screw connected with the drive shaft of the main body so as to be rotatably mounted on the main body and disposed inside the mesh drum, the feed screw including one or more screw spirals formed on an outer surface thereof,
    wherein the feed screw includes a plurality of retaining slots formed on a lower circumferential bottom surface thereof and the rotary brush includes a plurality of engagement parts formed on an inner circumferential surface of a lower end portion thereof so as to extend inwardly from the rotary brush, so that the engagement parts of the rotary brush are engaged with the retaining slots of the feed screw to cause the rotary brush to be rotated together with the rotation of the feed screw.

2. The juice extractor according to claim 1, wherein each of the engagement parts formed on the rotary brush includes an arm horizontally extending toward the center of the rotary brush from the inner circumferential surface of the lower end portion of the rotary brush by a predetermined length, and a retaining lug vertically extending bent upwardly from an end of the arm by a predetermined length so that the retaining lug is insertingly engaged with each of the retaining slots of the feed screw.

3. The juice extractor according to claim 1, wherein the housing includes a draff descending hole formed on a bottom surface thereof so as to fluidically communicate with the draff outlet port.

4. The juice extractor according to claim 3, wherein the housing includes a draff discharge guide recess formed on the bottom surface thereof so as to guide draff to the draff descending hole as the feed screw is rotated, the draff discharge guide recess being formed in a circular arcuate shape such that it starts at a predetermined point of the bottom surface of the housing and ends at the draff descending hole.

5. The juice extractor according to claim 4, wherein the draff discharge guide recess is formed such that it is gradually increased in depth and/or width as it goes toward the draff descending hole.

6. The juice extractor according to claim 3, wherein the arms of the engagement parts are rotated while pushingly moving the draff accumulated on the bottom surface of the housing.

7. The juice extractor according to claim 2, wherein the each arm is formed at a position corresponding to that of the draff descending hole so that when the rotary brush is rotated, the lower end surface of the arm grazes the upper end surface of the draff descending hole while intersecting the upper end surface of the draff descending hole.

8. The juice extractor according to claim 2, further comprising a stationary blade mounted on the bottom surface of the housing so as to be in close contact with the upper end surface of one side of the draff descending hole confronting the arm.

9. The juice extractor according to claim 8, wherein the stationary blade is made of alloy steel or ceramic material.

10. The juice extractor according to claim 2, wherein when the arm is rotated, a front end of the lower end surface of the arm and an upper end of the inner circumferential surface of the draff descending hole sequentially forms an intersecting contact point so that the lower end surface of the arm grazes the upper end surface of the draff descending hole.

11. The juice extractor according to claim 1, wherein the housing includes a hollow through-part formed protrudingly upwardly at the center of the bottom surface thereof and having a through-hole formed at the center of an upper portion thereof, and wherein a draff inflow space is formed inside the feed screw which accommodates the hollow through-part.

12. The juice extractor according to claim 1, wherein the cover includes a plurality of retaining projections formed on the inner circumferential surface of a lower portion thereof in such a manner as to be spaced apart from one another at predetermined angle intervals, and the mesh drum includes a plurality of retaining parts formed on the outer circumferential surface of an upper portion thereof to have angle intervals corresponding to those of the retaining projections, so that when the retaining parts are fittingly engaged between the retaining projections and are turned in the engaged state, they are prevented from being moved by the retaining projections, thereby preventing the mesh drum from being displaced.

13. The juice extractor according to claim 1, wherein the housing includes a plurality of retaining recesses formed on the inner circumferential surface of an upper portion thereof in such a manner as to be spaced apart from one another at predetermined angle intervals, and the mesh drum has a plurality of retaining projection parts formed on the outer circumferential surface of an upper portion thereof to have angle intervals corresponding to those of the retaining recesses, so that when the retaining projection parts of the mesh drum is fittingly engaged with the retaining recesses of the housing, the retaining projection parts are prevented from being moved by the lower end of the cover engaged with the retaining recesses and the upper end of the housing, thereby preventing the mesh drum from being displaced.

* * * * *